United States Patent
Yang

(10) Patent No.: US 9,571,616 B2
(45) Date of Patent: Feb. 14, 2017

(54) HOUSING, AND ELECTRONIC DEVICE USING SAME

(71) Applicants: SHENZHEN FUTAIHONG PRECISION INDUSTRY CO., LTD., Shenzhen (CN); FIH (HONG KONG) LIMITED, Kowloon (HK)

(72) Inventor: Ning Yang, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 4 days.

(21) Appl. No.: 14/605,337

(22) Filed: Jan. 26, 2015

(65) Prior Publication Data

US 2016/0065704 A1 Mar. 3, 2016

(30) Foreign Application Priority Data

Aug. 28, 2014 (CN) .......................... 2014 1 0429006

(51) Int. Cl.
| | |
|---|---|
| B32B 7/02 | (2006.01) |
| G02B 1/10 | (2015.01) |
| H04M 1/02 | (2006.01) |

(52) U.S. Cl.
CPC .......... *H04M 1/0283* (2013.01); *H04M 1/0202* (2013.01)

(58) Field of Classification Search
None
See application file for complete search history.

(56) References Cited

U.S. PATENT DOCUMENTS

| | | | | |
|---|---|---|---|---|
| 8,153,270 | B2 * | 4/2012 | Akieda | B32B 27/36 428/172 |
| 8,155,715 | B2 * | 4/2012 | Yang | H01R 13/5213 361/679.56 |
| 2006/0216498 | A1 * | 9/2006 | Chen | B05D 5/06 428/328 |
| 2012/0168339 | A1 * | 7/2012 | Jan | B29C 45/0055 206/524.1 |
| 2013/0257237 | A1 * | 10/2013 | Cao | B32B 15/08 312/204 |

FOREIGN PATENT DOCUMENTS

| | | |
|---|---|---|
| TW | 200635480 A | 10/2006 |
| TW | 201340824 A | 10/2013 |

OTHER PUBLICATIONS

RefractiveIndex.Info for Silicon Dioxide (2008): http://refractiveindex.info/?shelf=main&book=SiO2&page=Malitson.*
RefractiveIndex.Info for Tin (2008): http://refractiveindex.info/?shelf=main&book=Sn&page=Golovashkin-293.*
Goodfellow (2008): http://www.goodfellow.com/E/Polyethylene-terephthalate.html.*

* cited by examiner

*Primary Examiner* — David Sample
*Assistant Examiner* — Nicole T Gugliotta
(74) *Attorney, Agent, or Firm* — Zhigang Ma

(57) ABSTRACT

A housing includes a plurality of overlapping layers. Each layer has either transparent material or semitransparent material, and each layer has a different refractivity.

13 Claims, 3 Drawing Sheets

HOUSING, AND ELECTRONIC DEVICE USING SAME

FIELD

The subject matter herein generally relates to a housing, and an electronic device using the housing.

BACKGROUND

Metal housings are widely used for electronic devices such as mobile phones or personal digital assistants (PDAs). The weight of the metal housings is heavy, therefore the user can have an uncomfortable tactile feeling.

BRIEF DESCRIPTION OF THE FIGURES

Implementations of the present technology will now be described, by way of example only, with reference to the attached figures.

DETAILED DESCRIPTION

Figure 1:
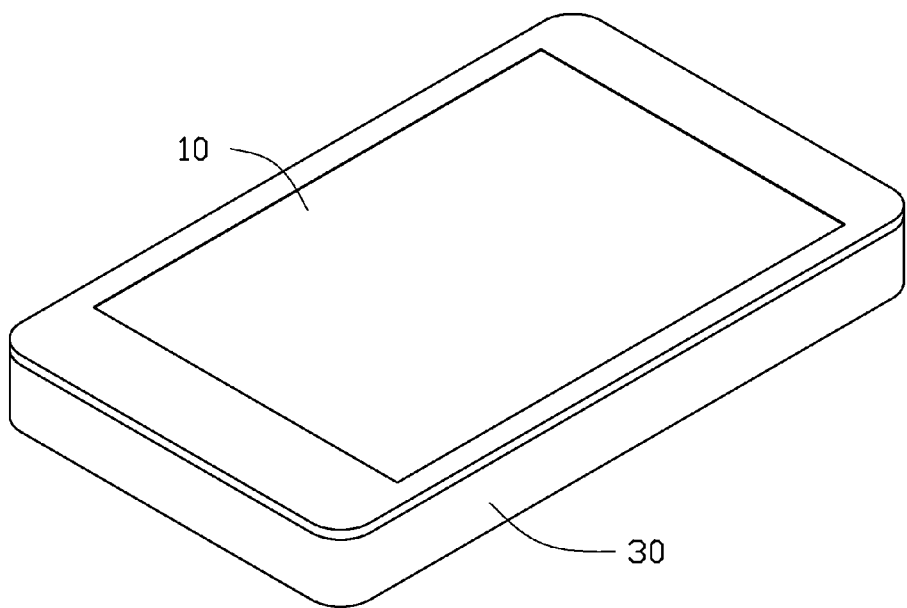
FIG. 1 is an isometric view of an electronic device, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

FIG. 1 illustrates an electronic device 100 according to an exemplary embodiment. The electronic device 100 can be, but not limited to, a mobile phone, a personal digital assistant, a music player or a tablet computer. In at least one exemplary embodiment, the electronic device 100 is a mobile phone.

The electronic device 100 includes a cover 10 and a housing 30, the cover 10 can be detachably assembled to the housing 30. The cover 10 and the housing 30 cooperatively form a receiving space to receive elements (not shown) of the electronic device 100, such as battery and printed circuit board.

Figure 2:
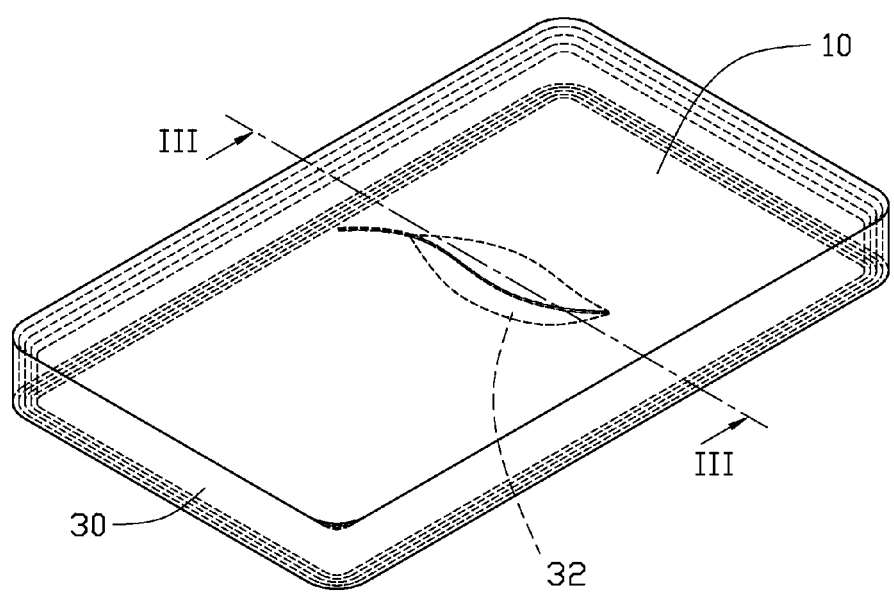
FIG. 2 is a perspective view of a housing of the electronic device shown in FIG. 1 according to an exemplary embodiment.
Figure 3:
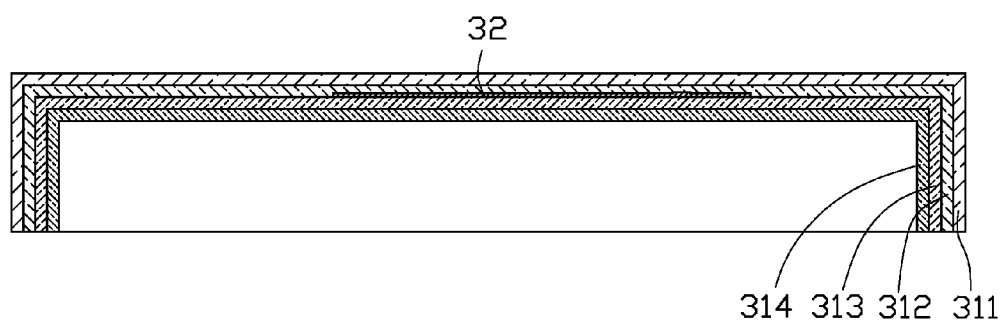
FIG. 3 is a cross-sectional view of the housing along line III-III of FIG. 2.

FIGS. 2-3 illustrate that the housing includes at least three layers. In at least one exemplary embodiment, the housing 30 includes a first layer 311, a second layer 312, a third layer 313, and a fourth layer 314. The first layer 311 can be substantially rectangular frame shaped, the second layer 312, the third layer 313 and the fourth layer 314 are orderly overlapped on an internal surface of the first layer 311.

The layer 311, 312, 313, 314 can be made of either transparent material or semitransparent material, and have different refractivity. In at least one exemplary embodiment, the layers 311, 312, 313, 314 are made of either transparent resin or semitransparent resin, and each layer has different refractivity. The index of refraction of each layer 311, 312, 313, 314 can be about 1.42 to about 1.69. The index of refraction of the housing 30 can gradually increase from a direction extending from an outer surface of the housing 30 to an internal surface of the housing 30. The index of refraction of the housing 30 can gradually increase from a direction extending from the first layer 311 located at the outer surface of the housing 30 to the fourth layer 314 located at the internal surface of the housing 30, such that the housing 30 can have a three-dimensional shape. Each layer 311, 312, 313, 314 has a thickness of about 0.2 mm to about 0.3 mm, such that the housing 30 has an thickness meet a need of the electronic device 100.

The housing 30 further can have a pattern layer 32. The pattern layer 32 can be located between each two adjacent layers 311, 312, 313, 314. In at least one exemplary embodiment, the pattern layer 32 is located between the second layer 312 and the third layer 313.

It is to be understood that the housing 30 can have a plurality of pattern layers 32, and the pattern layers 32 can be respectively located between each two adjacent layers 311, 312, 313, and 314 according to the need of the housing 30, as such the housing 30 can have a good three dimensional effect.

In at least one exemplary embodiment, the pattern layers 32 can be respectively printed on the layers 311, 312, 313, 314, such the housing 30 have a good three dimensional effect.

In at least one exemplary embodiment, pigments can be added into the layers 311, 312, 313, 314, as such the layers 311, 312, 313, 314 can have different colors. In the exemplary embodiment, the pigments can be colorant.

It is to be understood, however, that even through numerous characteristics and advantages of the present disclosure have been set forth in the foregoing description, together with details of assembly and function, the disclosure is illustrative only, and changes may be made in detail, including in the matters of shape, size, and arrangement of parts within the principles of the disclosure to the full extent indicated by the broad general meaning of the terms in which the appended claims are expressed.

What is claimed is:

1. A housing comprising:
    a plurality of overlapping layers, each layer having either transparent material or semitransparent material, and each layer having a different refractivity,
    wherein the plurality of layers includes at least three layers, an index of refraction of the layers increases from one layer located at an outer surface of the housing to another layer located at an internal surface of the housing.

2. The housing as claimed in claim 1, wherein the refractive index of each layer is about 1.42 to about 1.69.

3. The housing as claimed in claim 1, wherein each layer has a thickness of about 0.2 mm to about 0.3 mm.

4. The housing as claimed in claim 1, wherein each layer is made of either a transparent resin or a semitransparent resin.

5. The housing as claimed in claim 1, wherein each layer further contains pigments, such each layer has color.

6. The housing as claimed in claim 1, wherein the housing further includes at least one pattern layer located between two adjacent layers.

7. An electronic device, comprising:
   a housing, the housing including a plurality of overlapping layers, each layer being made of either transparent material or semitransparent material, and each layer having different refractivity; and
   a cover assembled to the housing,
   wherein the plurality of layers includes at least three layers, an index of refraction of the layers increases from one layer located at an outer surface of the housing to another layer located at an internal surface of the housing.

8. The electronic device as claimed in claim 7, wherein the cover and the housing cooperatively form a receiving space to receive elements of the electronic device.

9. The electronic device as claimed in claim 7, wherein each layer has a refractive index of about 1.42 to about 1.69.

10. The electronic device as claimed in claim 7, wherein each layer has a thickness of about 0.2 mm to about 0.3 mm.

11. The electronic device as claimed in claim 7, wherein each layer is made of either transparent resin or semitransparent resin.

12. The electronic device as claimed in claim 7, wherein each layer further contains pigments, such each layer has color.

13. The electronic device as claimed in claim 7, wherein the housing further includes at least one pattern layer, the pattern layer is located between each two adjacent layers.

* * * * *